US010506056B2

United States Patent
Strandell et al.

(10) Patent No.: US 10,506,056 B2
(45) Date of Patent: Dec. 10, 2019

(54) METHODS, APPARATUSES, AND COMPUTER PROGRAM PRODUCTS FOR PROVIDING FILTERED SERVICES AND CONTENT BASED ON USER CONTEXT

(71) Applicant: Nokia Technologies Oy, Espoo (FI)

(72) Inventors: Toni Peter Strandell, Helsinki (FI); Elina Vartiainen, Helsinki (FI); Janne Pekko Kaasalainen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/189,567

(22) Filed: Nov. 13, 2018

(65) Prior Publication Data

US 2019/0158612 A1 May 23, 2019

Related U.S. Application Data

(63) Continuation of application No. 15/882,617, filed on Jan. 29, 2018, now Pat. No. 10,129,351, which is a
(Continued)

(51) Int. Cl.
*G06F 15/173* (2006.01)
*H04L 29/08* (2006.01)
(Continued)

(52) U.S. Cl.
CPC ........ *H04L 67/22* (2013.01); *G06F 16/24575* (2019.01); *H04L 67/04* (2013.01);
(Continued)

(58) Field of Classification Search
CPC ......... H04L 67/22; H04L 67/04; H04L 67/20; H04L 67/2828; H04L 67/24;
(Continued)

(56) References Cited

U.S. PATENT DOCUMENTS

| 5,812,865 | A | 9/1998 | Theimer et al. |
| 5,832,296 | A | 11/1998 | Wang et al. |

(Continued)

FOREIGN PATENT DOCUMENTS

| EP | 1326185 A1 | 7/2003 |
| EP | 1624416 A2 | 2/2006 |

(Continued)

OTHER PUBLICATIONS

Office Action for corresponding European Patent Application No. 09718661.3, dated Sep. 1, 2011 4 pages.
(Continued)

*Primary Examiner* — Melvin H Pollack
(74) *Attorney, Agent, or Firm* — Ditthavong & Steiner, P.C.

(57) ABSTRACT

An apparatus may include a processor configured to receive a request for a service or content from a first device. The processor may be further configured to receive a user's context information from a second device. The processor may additionally be configured to filter the requested service or content based at least in part upon the user's context information. The processor may be further configured to provide the filtered service or content to the first device. Corresponding methods and computer program products are also provided.

20 Claims, 5 Drawing Sheets

Related U.S. Application Data continuation of application No. 15/270,790, filed on Sep. 20, 2016, now Pat. No. 9,882,998, which is a continuation of application No. 14/184,222, filed on Feb. 19, 2014, now Pat. No. 9,451,037, which is a continuation of application No. 12/048,280, filed on Mar. 14, 2008, now Pat. No. 8,682,960.

(51) Int. Cl.
| | |
|---|---|
| *G06F 16/2457* | (2019.01) |
| *H04M 3/42* | (2006.01) |
| *H04W 8/24* | (2009.01) |
| *G06F 15/16* | (2006.01) |
| *H04W 8/22* | (2009.01) |

(52) U.S. Cl.
CPC .......... *H04L 67/20* (2013.01); *H04L 67/2828* (2013.01); *H04M 3/42357* (2013.01); *H04W 8/24* (2013.01); *H04L 67/24* (2013.01); *H04L 67/2895* (2013.01); *H04W 8/22* (2013.01)

(58) Field of Classification Search
CPC .......... H04L 67/2895; G06F 16/24575; H04M 3/42357; H04W 8/24; H04W 8/22
USPC ....................................................... 709/224
See application file for complete search history.

(56) References Cited

U.S. PATENT DOCUMENTS

| | | | |
|---|---|---|---|
| 6,411,899 B2 | 6/2002 | Dussell et al. | |
| 6,580,914 B1 | 6/2003 | Smith | |
| 6,697,842 B1 | 2/2004 | Smith et al. | |
| 6,714,778 B2 | 3/2004 | Nykänen | |
| 6,750,883 B1 | 6/2004 | Parupudi et al. | |
| 6,842,877 B2 | 1/2005 | Robarts et al. | |
| 6,857,021 B1 | 2/2005 | Schuster et al. | |
| 6,931,429 B2 | 8/2005 | Gouge et al. | |
| 6,944,447 B2 | 9/2005 | Portman et al. | |
| 6,957,393 B2 | 10/2005 | Fano et al. | |
| 6,968,333 B2 | 11/2005 | Abbott et al. | |
| 6,968,334 B2 | 11/2005 | Salmenkaita et al. | |
| 7,030,837 B1 | 4/2006 | Vong et al. | |
| 7,054,614 B1 | 5/2006 | Hunzinger | |
| 7,055,101 B2 | 5/2006 | Abbott et al. | |
| 7,062,715 B2 | 6/2006 | Abbott et al. | |
| 7,073,129 B1 | 7/2006 | Robarts et al. | |
| 7,076,737 B2 | 7/2006 | Abbott et al. | |
| 7,080,322 B2 | 7/2006 | Abbott et al. | |
| 7,096,029 B1 | 8/2006 | Parupudi et al. | |
| 7,107,539 B2 | 9/2006 | Abbott et al. | |
| 7,137,069 B2 | 11/2006 | Abbott et al. | |
| 7,187,997 B2 | 3/2007 | Johnson | |
| 7,233,786 B1 | 6/2007 | Harris et al. | |
| 7,257,392 B2 | 8/2007 | Tang et al. | |
| 7,315,885 B2 | 1/2008 | Weisshaar et al. | |
| 7,395,507 B2 | 7/2008 | Robarts et al. | |
| 7,467,353 B2 | 12/2008 | Kurlander et al. | |
| 7,487,248 B2 | 2/2009 | Moran et al. | |
| 7,539,747 B2 | 5/2009 | Lucovsky et al. | |
| 7,565,138 B2 | 7/2009 | Kim et al. | |
| 7,584,290 B2 | 9/2009 | Ruskin et al. | |
| 7,586,871 B2 | 9/2009 | Hamilton et al. | |
| 7,614,001 B2 | 11/2009 | Abbott et al. | |
| 7,624,185 B2 | 11/2009 | Miller | |
| 7,627,098 B2 | 12/2009 | Baik et al. | |
| 7,657,594 B2 | 2/2010 | Banga et al. | |
| 7,660,902 B2 | 2/2010 | Graham et al. | |
| 7,668,931 B2 | 2/2010 | Parupudi et al. | |
| 7,673,330 B2 | 3/2010 | Bussard et al. | |
| 7,716,280 B2 | 5/2010 | Meijer et al. | |
| 7,725,532 B2 | 5/2010 | Jeon et al. | |
| 7,730,177 B2 | 6/2010 | Brown | |
| 7,747,680 B2 * | 6/2010 | Ravikumar ......... G06F 21/6218 | 434/50 |
| 7,747,704 B2 | 6/2010 | Parupudi et al. | |
| 7,769,767 B2 | 8/2010 | Petersen | |
| 7,779,015 B2 | 8/2010 | Abbott et al. | |
| 7,783,613 B2 * | 8/2010 | Gupta ................. H04L 67/2823 | 707/693 |
| 7,814,142 B2 | 10/2010 | Mamou et al. | |
| 7,818,206 B2 * | 10/2010 | Smith ................... G06Q 30/02 | 705/14.1 |
| 7,843,857 B2 | 11/2010 | Kim et al. | |
| 7,844,667 B2 | 11/2010 | Ito et al. | |
| 7,856,226 B2 | 12/2010 | Wong et al. | |
| 7,877,293 B2 | 1/2011 | Biebesheimer et al. | |
| 7,890,592 B2 | 2/2011 | Setiawan et al. | |
| 7,925,995 B2 | 4/2011 | Krumm et al. | |
| 8,019,692 B2 | 9/2011 | Rosen | |
| 8,019,777 B2 * | 9/2011 | Hauser ................. G06Q 30/02 | 707/769 |
| 8,031,050 B2 | 10/2011 | Johnson | |
| 8,046,436 B2 | 10/2011 | Martinez et al. | |
| 8,060,389 B2 | 11/2011 | Johnson | |
| 8,060,459 B2 | 11/2011 | Gray | |
| 8,073,565 B2 | 12/2011 | Johnson | |
| 8,081,610 B2 | 12/2011 | Stirbu et al. | |
| 8,089,957 B2 | 1/2012 | Bennett | |
| 8,108,516 B2 | 1/2012 | Zmolek | |
| 8,138,930 B1 | 3/2012 | Heath | |
| 8,145,754 B2 * | 3/2012 | Chamberlain ..... G06Q 30/0201 | 709/224 |
| 8,156,206 B2 | 4/2012 | Kiley et al. | |
| 8,166,173 B2 | 4/2012 | Low et al. | |
| 8,219,670 B2 * | 7/2012 | Agrawala ........... H04L 67/2814 | 709/224 |
| 8,234,346 B2 | 7/2012 | Rao et al. | |
| 8,234,366 B2 | 7/2012 | Suryanarayana et al. | |
| 8,250,616 B2 | 8/2012 | Davis et al. | |
| 8,255,791 B2 | 8/2012 | Koren | |
| 8,307,029 B2 | 11/2012 | Davis et al. | |
| 8,381,268 B2 | 2/2013 | Winget et al. | |
| 8,429,300 B2 | 4/2013 | Jeong et al. | |
| 8,452,277 B2 * | 5/2013 | Hurowitz .............. H04L 67/322 | 455/433 |
| 8,468,227 B2 * | 6/2013 | Vasudevan .............. H04L 29/06 | 709/223 |
| 8,472,972 B2 | 6/2013 | Nadler et al. | |
| 8,499,028 B2 * | 7/2013 | Shu ..................... H04L 67/2823 | 709/202 |
| 8,510,425 B2 | 8/2013 | Bantz et al. | |
| 8,554,876 B2 * | 10/2013 | Winsor .................... H04L 29/06 | 709/219 |
| 8,555,352 B2 | 10/2013 | Moisand et al. | |
| 8,560,400 B1 | 10/2013 | Lee | |
| 8,566,447 B2 | 10/2013 | Cohen et al. | |
| 8,589,568 B2 | 11/2013 | Arnold et al. | |
| 8,594,702 B2 | 11/2013 | Naaman et al. | |
| 8,630,612 B1 * | 1/2014 | Baker ................. G06Q 10/103 | 455/405 |
| 8,639,650 B1 * | 1/2014 | Gill ........................ G06N 5/04 | 706/61 |
| 8,645,516 B2 * | 2/2014 | Bechtel ................ G06Q 10/10 | 709/223 |
| 8,667,105 B1 | 3/2014 | Kenward | |
| 8,667,179 B2 | 3/2014 | Miller et al. | |
| 8,682,960 B2 | 3/2014 | Strandell et al. | |
| 8,719,903 B1 * | 5/2014 | Kilday ................... G06F 21/62 | 726/4 |
| 8,736,547 B2 | 5/2014 | Goddi et al. | |
| 8,781,491 B2 | 7/2014 | Wright et al. | |
| 8,782,146 B2 | 7/2014 | Brouk et al. | |
| 8,798,647 B1 | 8/2014 | Haney | |
| 8,818,338 B2 * | 8/2014 | Gidron ................. G06Q 30/06 | 370/229 |
| 8,943,425 B2 | 1/2015 | Wickramasuriya et al. | |
| 8,989,778 B2 * | 3/2015 | Altman ................. H04W 4/029 | 455/456.3 |
| 9,003,488 B2 * | 4/2015 | Spencer ................. H04W 8/22 | 726/3 |
| 9,055,017 B2 * | 6/2015 | Agarwal ............. H04L 12/1859 | |
| 9,066,199 B2 | 6/2015 | Forstall et al. | |

(56) References Cited

U.S. PATENT DOCUMENTS

| | | | |
|---|---|---|---|
| 9,143,540 B2 | 9/2015 | Jansson | |
| 9,179,261 B2 | 11/2015 | De Vries | |
| 9,286,388 B2 | 3/2016 | Marsh | |
| 9,317,867 B2 | 4/2016 | Johnson | |
| 9,386,327 B2 | 7/2016 | La Joie et al. | |
| 9,451,037 B2 | 9/2016 | Strandell et al. | |
| 9,509,674 B1 | 11/2016 | Nasserbakht et al. | |
| 9,529,854 B2* | 12/2016 | Keeler | H04W 4/18 |
| 9,811,728 B2 | 11/2017 | King et al. | |
| 9,882,998 B2 | 1/2018 | Strandell et al. | |
| 9,892,206 B2 | 2/2018 | Levy | |
| 9,959,694 B2 | 5/2018 | Lindsay | |
| 10,129,351 B2 | 11/2018 | Strandell et al. | |
| 10,341,808 B2* | 7/2019 | Haney | H04W 4/02 |
| 2002/0099829 A1 | 7/2002 | Richards et al. | |
| 2003/0046401 A1 | 3/2003 | Abbott et al. | |
| 2003/0050964 A1 | 3/2003 | Debaty et al. | |
| 2003/0135582 A1 | 7/2003 | Allen et al. | |
| 2003/0140088 A1 | 7/2003 | Robinson et al. | |
| 2003/0149823 A1 | 8/2003 | Newman et al. | |
| 2003/0182394 A1 | 9/2003 | Ryngler et al. | |
| 2003/0212569 A1 | 11/2003 | Casati et al. | |
| 2003/0215067 A1 | 11/2003 | Ordille et al. | |
| 2004/0002948 A1 | 1/2004 | Mantyjarvi et al. | |
| 2004/0093155 A1 | 5/2004 | Simonds et al. | |
| 2004/0153373 A1 | 8/2004 | Song et al. | |
| 2005/0021369 A1 | 1/2005 | Cohen et al. | |
| 2005/0032528 A1 | 2/2005 | Dowling et al. | |
| 2005/0071361 A1 | 3/2005 | Hettish et al. | |
| 2005/0097595 A1 | 5/2005 | Lipsanen et al. | |
| 2005/0149862 A1 | 7/2005 | Weitzman et al. | |
| 2005/0219223 A1 | 10/2005 | Kotzin et al. | |
| 2006/0026288 A1 | 2/2006 | Acharya et al. | |
| 2006/0069714 A1 | 3/2006 | Blount et al. | |
| 2006/0073788 A1 | 4/2006 | Halkka et al. | |
| 2006/0084381 A1 | 4/2006 | Hartwig | |
| 2006/0136393 A1 | 6/2006 | Abbott et al. | |
| 2006/0149905 A1 | 7/2006 | Park et al. | |
| 2006/0190974 A1 | 8/2006 | Lee | |
| 2007/0027732 A1 | 2/2007 | Hudgens | |
| 2007/0165812 A1 | 7/2007 | Lee et al. | |
| 2007/0198633 A1 | 8/2007 | Thibeault | |
| 2007/0238488 A1 | 10/2007 | Scott | |
| 2007/0244932 A1 | 10/2007 | Ahn et al. | |
| 2007/0255831 A1 | 11/2007 | Hayashi et al. | |
| 2007/0282621 A1 | 12/2007 | Altman et al. | |
| 2008/0005071 A1 | 1/2008 | Flake et al. | |
| 2008/0005238 A1 | 1/2008 | Hall et al. | |
| 2008/0009268 A1 | 1/2008 | Ramer et al. | |
| 2008/0040488 A1 | 2/2008 | Gupta et al. | |
| 2008/0052407 A1 | 2/2008 | Baudino et al. | |
| 2008/0065774 A1 | 3/2008 | Keeler | |
| 2008/0108373 A1 | 5/2008 | Agarwal et al. | |
| 2008/0139114 A1 | 6/2008 | Ranganathan | |
| 2008/0147730 A1 | 6/2008 | Lee et al. | |
| 2008/0183645 A1 | 7/2008 | Burger et al. | |
| 2008/0189170 A1 | 8/2008 | Ramachandra | |
| 2008/0194270 A1 | 8/2008 | Greenberg | |
| 2008/0261593 A1 | 10/2008 | Wong et al. | |
| 2009/0018899 A1 | 1/2009 | Ogushi et al. | |
| 2009/0055398 A1 | 2/2009 | Zhu et al. | |
| 2009/0083826 A1 | 3/2009 | Baribault | |
| 2009/0102676 A1 | 4/2009 | Hoffman et al. | |
| 2009/0111487 A1 | 4/2009 | Scheibe | |
| 2009/0177685 A1 | 7/2009 | Ellis et al. | |
| 2009/0204677 A1 | 8/2009 | Michaelis et al. | |
| 2009/0234909 A1 | 9/2009 | Strandell et al. | |
| 2009/0276386 A1 | 11/2009 | Greening et al. | |
| 2010/0217855 A1 | 8/2010 | Przybysz et al. | |
| 2011/0001812 A1 | 1/2011 | Kang et al. | |
| 2011/0167479 A1 | 7/2011 | Maes | |
| 2011/0252080 A1 | 10/2011 | Singh et al. | |
| 2011/0270971 A1* | 11/2011 | Abraham | G06Q 10/0637 709/224 |
| 2011/0276412 A1* | 11/2011 | Mgrdechian | G06Q 30/0207 705/14.66 |
| 2012/0042044 A1 | 2/2012 | Vishwanathan et al. | |
| 2012/0190386 A1 | 7/2012 | Anderson | |
| 2012/0311139 A1* | 12/2012 | Brave | G06F 16/9535 709/224 |
| 2012/0331098 A1 | 12/2012 | Ertugrul et al. | |
| 2012/0331135 A1 | 12/2012 | Alon et al. | |
| 2013/0029719 A1 | 1/2013 | Choi et al. | |
| 2013/0346546 A1 | 12/2013 | Jung | |
| 2014/0101040 A1 | 4/2014 | Li et al. | |
| 2014/0192717 A1 | 7/2014 | Liu et al. | |
| 2014/0195641 A1 | 7/2014 | Wang et al. | |
| 2014/0237342 A1 | 8/2014 | King et al. | |
| 2015/0147973 A1 | 5/2015 | Williams et al. | |
| 2017/0344703 A1* | 11/2017 | Ansari | H04L 63/0876 |

FOREIGN PATENT DOCUMENTS

| | | |
|---|---|---|
| EP | 1679844 A1 | 7/2006 |
| EP | 2252948 B1 | 8/2019 |
| WO | 0079406 A1 | 12/2000 |
| WO | 0175676 A2 | 10/2001 |
| WO | 2007050177 A1 | 5/2007 |

OTHER PUBLICATIONS

Supplementary European Search Report for corresponding European Patent Application No. 09718661.3, dated Aug. 26, 2011, 2 pages.

International Search Report for PCT Application No. PCT/FI2009/050129, dated Jun. 10, 2009.

Written Opinion for PCT Application No. PCT/FI2009/050129, dated Jun. 10, 2009.

European Office Action for related European Patent Application No. 09718661.3-1853 dated Apr. 19, 2016, 8 Pages.

Schilit et al., "Context-Aware Communication", IEEE Wireless Communications Magazine, Oct. 15, 2002, vol. 9, No. 5, retrieved from http://citeseerx.ist.psu.edu/viewdoc/download?doi=10.1.1.117.2269&rep=rep1&type=pdf, 9 Pages.

Lemlouma et al., "Adapted Content Delivery for Different Contexts", IEEE Proceedings Symposium on Applications and the Internet, Jan. 27-31, 2003, retrieved from https://hal.inria.fr/inria-00423426/document, 9 Pages.

Agostini et al., "Towards Highly Adaptive Services for Mobile Computing", IFIP International Federation for Information Processing, Sep. 2004, vol. 158/2000, No. 1571-5736, retrieved from http://citeseerx.ist.psu.edu/viewdoc/download?doi=10.1.1.125.2339&rep=rep1&type=pdf, 14 Pages.

Victor, "Magic Ink", Information Software and the Graphical Interface, Mar. 15, 2006, retrieved from http://worrydream.com/MagicInk/MagicInk.pdf, 73 Pages.

Agostini et al., "Demo: Ontology-Based Context-Aware Delivery of Extended Points of Interest", Proceedings of the 6th International Conference on Mobile Data Management, Jan. 2005, retrieved from https://homes.di.unimi.it/riboni/mdm05.pdf, 2 Pages.

Bettini et al., "Profile Aggregation and Policy Evaluation of Adaptive Internet Services", The First Annual International Conference on Mobile and Ubiquitous Systems: Networking and Services, Aug. 26, 2004, retrieved from http://webmind.di.unimi.it/arch/mobiquitous04.pdf, 9 Pages.

Pareschi et al., "Towards Privacy Protection in a Middleware for Context-Awareness (Short Paper)", Proceedings of Context Awareness and Trust Workshop, 2007, retrieved from http://ceur-ws.org/Vol-269/paper4.pdf, 6 Pages.

Kirsch-Pinheiro et al., "Context-Aware Filtering for Collaborative Web Systems: Adapting the Awareness Information to the User's Context", ACM Symposium on Applied Computing, 2005, retrieved from http://dmod.eu/deca/Context-Aware%20Filtering.pdf, 6 Pages.

Office Action for corresponding European Patent Application No. 09 718 661.3-1853, dated Feb. 10, 2017, 9 pages.

Paganelli et al., "A Context Model for Context-Aware System Design Towards the Ambient Intelligence Vision: Experiences in the

(56) References Cited

OTHER PUBLICATIONS eTourism Domain", Universal Access in Ambient Intelligence Environments, Lecture Notes in Computer Science, vol. 4397, 2007, pp. 173-191.

Schilit, "A System Architecture for Context-Aware Mobile Computing", 1995, 153 pages.

Aalto et al., "Bluetooth and WAP Push Based Location-Aware Mobile Advertising System", Published in Proceedings of the 2nd international conference on Mobile systems, applications, and services, 2004, pp. 49-58.

Kostakos et al., "Building Common Ground for Face to Face Interactions by Sharing Mobile Device Context", May 2006, pp. 222-238.

Davidyuk et al., "Context-Aware Middleware for Mobile Multimedia Applications", Jan. 2004, 8 pages.

Norrie et al., "Context-aware platform for mobile data management", Wireless Networks (WINET), vol. 13, No. 6, Springer, Dec. 2007, pp. 855-870.

Hofer et al., "Context-Awareness on Mobile Devices—the Hydrogen Approach", Proceedings of the 36th Annual Hawaii International Conference on System Sciences, 2003, 10 pages.

Debaty et al., "Integrating the Physical World with the Web to Enable Context-Enhanced Services", Mobile Networks and Applications, Sep. 8, 2003, vol. 10, Issue 4, 16 pages.

Aroyo et al., "Semantic-based framework for personalised ambient media", Multimed Tools Appl (2008) 36, published online, Dec. 21, 2006, pp. 71-87.

Wireless Personal Communications, "UbiqMuseum a Bluetooth and Java based context-aware system for ubiquitous computing", Wireless Personal Communications, vol. 38, Issue: 2, Springer, (Jul. 2006), 12 pages.

Braun et al., "Accessing Web Applications with Multiple Context-Aware Devices", Jan. 2004, pp. 1-14.

Salber et al., "The Context Toolkit Aiding the Development of Context-Enabled Applications", Technical Report GIT-GVU-98-33, 1999, 8 pages.

Want et al., "The Personal Server: Changing the Way We Think about Ubiquitous Computing", Part of the Lecture Notes in Computer Science book series (LNCS, vol. 2498), 2002 pp. 194-209.

Chen et al., "Ubiquitous Provision of Context Aware Web Services", Sep. 2006, 9 pages.

Matsushita et al., "Wearable Key Device for Personalizing nearby Environment", The Fourth International Symposium on Wearable Computers, Feb. 2000, 8 pages.

Doulkeridis et al., "A System Architecture for Context-Aware Service Discovery", Electronic Notes in Theoretical Computer Science, vol. 146, Issue 1, Jan. 24, 2006, pp. 101-116.

Lee et al., "Location-Based Service with Context Data for a Restaurant Recommendation", Database and Expert Systems Applications. DEXA 2006, Part of the Lecture Notes in Computer Science book series (LNCS, vol. 4080), 2006, pp. 430-438.

* cited by examiner

METHODS, APPARATUSES, AND COMPUTER PROGRAM PRODUCTS FOR PROVIDING FILTERED SERVICES AND CONTENT BASED ON USER CONTEXT

CROSS-REFERENCE TO RELATED APPLICATION

This application is a continuation of U.S. patent application Ser. No. 15/882,617 (now U.S. Pat. No. 10,129,351), filed on Jan. 29, 2018, entitled "Methods, Apparatuses, and Computer Program Products for Providing Filtered Services and Content Based on User Context," which is a continuation of U.S. patent application Ser. No. 15/270,790 (now U.S. Pat. No. 9,882,998), filed on Sep. 20, 2016, entitled "Methods, Apparatuses, and Computer Program Products for Providing Filtered Services and Content Based on User Context," which is a continuation of U.S. patent application Ser. No. 14/184,222 (now U.S. Pat. No. 9,451,037), filed on Feb. 19, 2014, entitled "Methods, Apparatuses, and Computer Program Products for Providing Filtered Services and Content Based on User Context," which is a continuation of U.S. patent application Ser. No. 12/048,280 (now U.S. Pat. No. 8,682,960), filed on Mar. 14, 2008, entitled "Methods, Apparatuses, and Computer Program Products for Providing Filtered Services and Content Based on User Context," the entirety of which is incorporated herein by reference.

TECHNOLOGICAL FIELD

Embodiments of the present invention relate generally to mobile communication technology and, more particularly, relate to methods, apparatuses, and computer program products for automatically filtering requested services and content based on the context of the requesting user.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to further improve the ease of information transfer and convenience to users involves the transfer of information to a user depending on the context of the user. In this regard, the context of a user may include, for example, a user's location, i.e., at home or at work, other individuals in the user's presence, a time of day, or a date. When using a service or accessing content from a content provider, a user may wish that the service or content be filtered or otherwise tailored depending on his context. For example, when accessing photographs from a photograph hosting service, a user may wish to only be provided with candid photographs with friends and family when accessing photographs from his home, but may wish to only be provided with work-related photographs when accessing photographs from his office. In this regard, content or services accessed by a user may contain sensitive data or other information that a user may not wish to be revealed depending on his context. Moreover, data or information that is sensitive in one context may not be sensitive in another context.

Some existing technologies may allow a user to configure content filtering based upon the access device used, such as through the use of web browser cookies. However these technologies do not allow for automatic context-based filtering based on contexts other than user access device. Moreover, with the increasing prevalence of laptops and other mobile computing devices these technologies do not account for situations in which mobile computing devices are used by a user in multiple locations for which it may be desirable to have filtering criteria for each location of use. Additionally, some existing devices may monitor their own location to provide for context-based filtering of content or services viewed on the device. However, again these technologies do not provide any aid to a user who wishes to access content or services on another device.

Accordingly, it may be advantageous to provide users with a system for automatically monitoring user context information and filtering content or services requested by the user on any computing device based upon context filtering criteria.

BRIEF SUMMARY

A method, apparatus, and computer program product are therefore provided to enable automatically filtering requested services or content depending on the context of the requesting user. In particular, a method, apparatus, and computer program product are provided to enable, for example, a user of any first device to request delivery of services or content to the first device from a remote device. The requested service or content may then be automatically filtered according to filtering criteria based upon the user's context, which is monitored and provided by a second device associated with the user, and subsequently provided to the first device. Accordingly, user experience may be enhanced by enabling a user to define preferences for the delivery of services and content based upon the context of the user, which provide for the automatic filtering of provided services and content regardless of the device which the user uses to access the services and content.

In one exemplary embodiment, a method is provided which may include receiving a request for a service or content from a first device and receiving a user's context information from a second device. The method may further include filtering the requested service or content based at least in part upon the user's context information. The method may additionally include providing the filtered service or content to the first device.

In another exemplary embodiment, a computer program product is provided. The computer program product includes at least one computer-readable storage medium having computer-readable program code portions stored therein. The computer-readable program code portions include first, second, third, and fourth executable portions. The first executable portion is for receiving a request for a service or content from a first device. The second executable portion is for receiving a user's context information from a second device. The third executable portion is for filtering the requested service or content based at least in part upon the user's context information. The fourth executable portion is for providing the filtered service or content to the first device.

In another exemplary embodiment, an apparatus is provided, which may include a processor. The processor may be configured to receive a request for a service or content from a first device and to receive a user's context information from a second device. The processor may be further configured to filter the requested service or content based at least in part upon the user's context information. The processor may additionally be configured to provide the filtered service or content to the first device.

In another exemplary embodiment, an apparatus is provided. The apparatus may include means for receiving a request for a service or content from a first device. The apparatus may further include means for receiving a user's context information from a second device. The apparatus may additionally include means for filtering the requested service or content based at least in part upon the user's context information. The apparatus may also include means for providing the filtered service or content to the first device.

Embodiments of the invention may therefore provide a method, apparatus, and computer program product to enhance user experience related to accessing content or services provided by remote devices. As a result, for example, users may benefit from receiving filtered or otherwise tailored content or services based upon their current context regardless of the device used to access the services or content.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
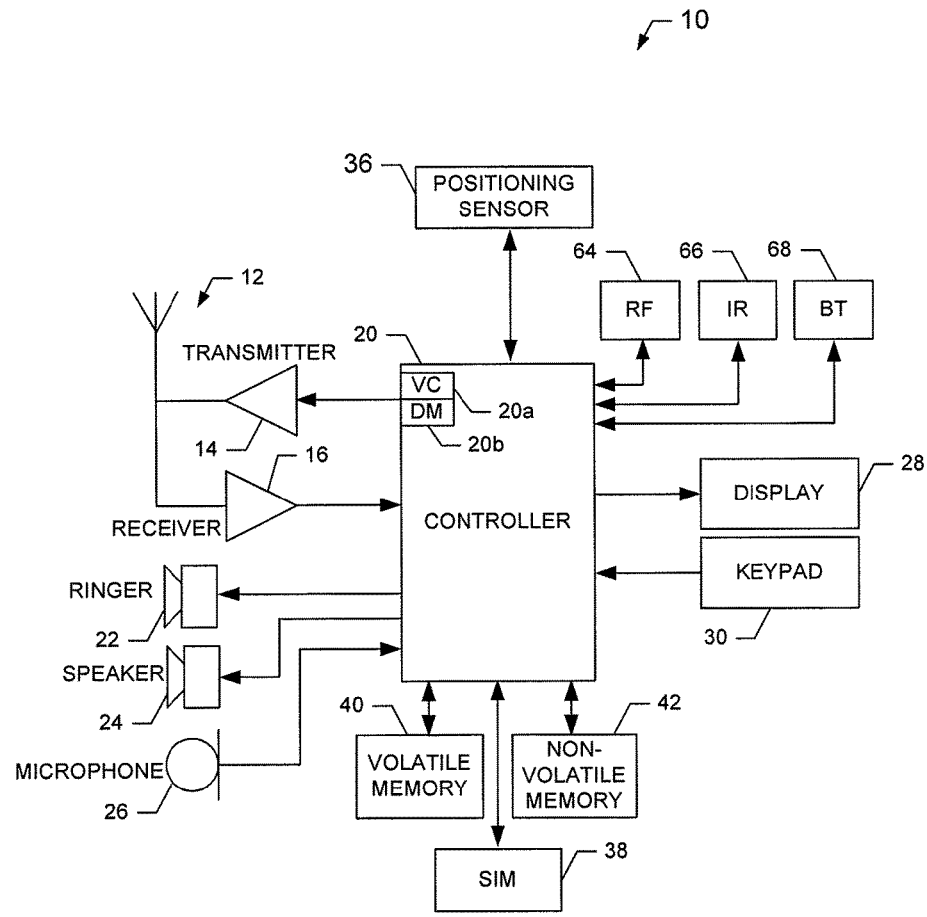
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that may benefit from the present invention. It should be understood, however, that the mobile terminal illustrated and hereinafter described is merely illustrative of one type of electronic device that may benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile communication devices, portable digital assistants (PDAs), pagers, mobile computers, laptop computers, desktop computers, gaming devices, audio/video players, digital still/video cameras, positioning devices (such as a Global Positioning System (GPS) device), televisions, or any combination of the aforementioned, and other types of electronic systems, may employ embodiments of the present invention.

As shown, the mobile terminal 10 may include one or more antenna 12 in communication with one or more transmitter 14 and receiver 16 combinations, only one of which is shown in the figure. The mobile terminal may also include a controller 20 or other processor that provides signals to and receives signals from the transmitter and receiver, respectively. These signals may include signaling information in accordance with an air interface standard of an applicable cellular system, and/or any number of different wireless networking techniques, comprising but not limited to Wireless-Fidelity (Wi-Fi), wireless LAN (WLAN) techniques such as IEEE 802.11, Ultra Wide Band (UWB), Bluetooth™, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various mobile communication protocols, such as for example, first generation (1G), second generation (2G), 2.5G, third-generation (3G) communication protocols, fourth-generation (4G) communication protocols, and/or the like. For example, the mobile terminal may be capable of operating in accordance with 2G wireless communication protocols IS-136 (TDMA), GSM, and IS-95 (CDMA). Also, for example, the mobile terminal may be capable of operating in accordance with 2.5G wireless communication protocols GPRS, EDGE, or the like. Further, for example, the mobile terminal may be capable of operating in accordance with 3G wireless communication protocols such as a UMTS network employing WCDMA radio access technology. Some NAMPS, as well as TACS, mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) protocols.

It is understood that the controller 20 may comprise the circuitry required for implementing audio and logic functions of the mobile terminal 10. For example, the controller 20 may be a digital signal processor device, a microprocessor device, an analog-to-digital converter, a digital-to-analog converter, and/or the like. Control and signal processing functions of the mobile terminal may be allocated between these devices according to their respective capabilities. The controller may additionally comprise an internal voice coder (VC) 20a, an internal data modem (DM) 20b, and/or the like. Further, the controller may comprise functionality to operate one or more software programs, which may be stored in memory. For example, the controller 20 may be capable of operating a connectivity program, such as a Web browser. The connectivity program may allow the mobile terminal 10 to transmit and receive Web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive Web content across Internet 50.

The mobile terminal 10 may also comprise a user interface including a conventional earphone or speaker 24, a ringer 22, a microphone 26, a display 28, a user input interface, and/or the like, which may be coupled to the controller 20. Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise conventional numeric (0-9) and related keys (#, *), and/or other keys for operating the mobile terminal.

As shown in FIG. 1, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be capable of operating according to Wibree™ radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, Ultra Wide Band (UWB), and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. In this regard, the mobile terminal may comprise volatile memory 40, such as volatile Random Access Memory (RAM), which may comprise a cache area for temporary storage of data. The mobile terminal may comprise other non-volatile memory 42, which may be embedded and/or may be removable. The non-volatile memory may comprise an EEPROM, flash memory, and/or the like. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

The mobile terminal 10 may further comprise a positioning sensor 36. The positioning sensor 36 may include, for example, a global positioning system (GPS) sensor, an assisted global positioning system (Assisted-GPS) sensor, etc. In one embodiment, however, the positioning sensor includes a pedometer or inertial sensor. Further, the positioning sensor may determine the location of the mobile terminal based upon signal triangulation or other mechanisms. The positioning sensor is capable of determining a location of the mobile terminal, such as latitude and longitude coordinates of the mobile terminal or a position relative to a reference point such as a destination or a start point. Information from the positioning sensor may be communicated to a memory of the mobile terminal or to another memory device to be stored as a position history or location information. Furthermore, the memory of the mobile terminal may store instructions for determining cell id information. In this regard, the memory may store an application program for execution by the controller 20, which determines an identity of the current cell, i.e., cell id identity or cell id information, with which the mobile terminal is in communication. In conjunction with the positioning sensor, the cell id information may be used to more accurately determine a location of the mobile terminal.

Figure 2:
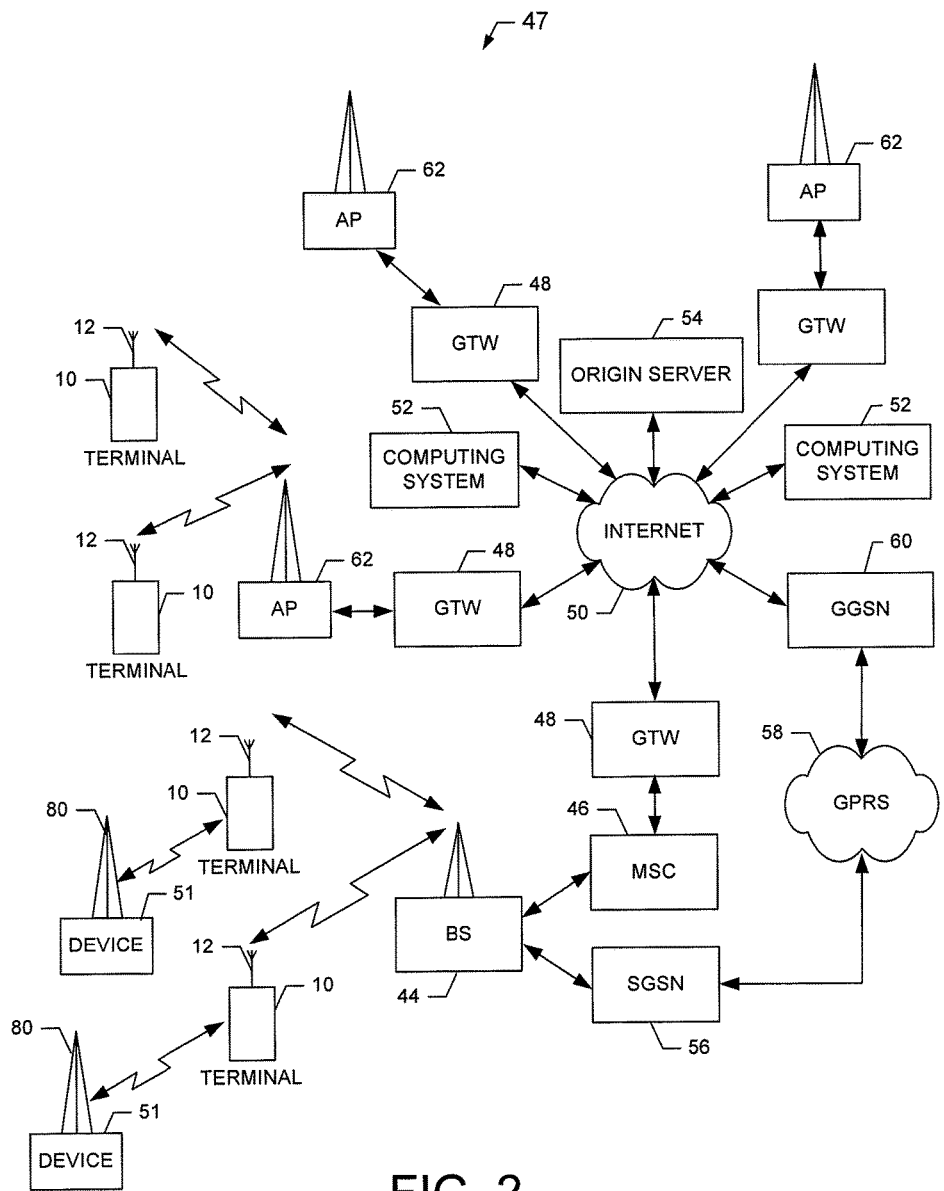
FIG. 2 is a schematic block diagram of a wireless communications system according to an exemplary embodiment of the present invention.

Referring now to FIG. 2, an illustration of one type of system that could support communications to and from an electronic device, such as the mobile terminal of FIG. 1, is provided by way of example, but not of limitation. As shown, one or more mobile terminals 10 may each include an antenna 12 for transmitting signals to and for receiving signals from a base site or base station (BS) 44. The base station 44 may be a part of one or more cellular or mobile networks each of which may comprise elements required to operate the network, such as a mobile switching center (MSC) 46. As well known to those skilled in the art, the mobile network may also be referred to as a Base Station/MSC/Interworking function (BMI). In operation, the MSC 46 may be capable of routing calls to and from the mobile terminal 10 when the mobile terminal 10 is making and receiving calls. The MSC 46 may also provide a connection to landline trunks when the mobile terminal 10 is involved in a call. In addition, the MSC 46 may be capable of controlling the forwarding of messages to and from the mobile terminal 10, and may also control the forwarding of messages for the mobile terminal 10 to and from a messaging center. It should be noted that although the MSC 46 is shown in the system of FIG. 2, the MSC 46 is merely an exemplary network device and the present invention is not limited to use in a network employing an MSC.

The MSC 46 may be coupled to a data network, such as a local area network (LAN), a metropolitan area network (MAN), and/or a wide area network (WAN). The MSC 46 may be directly coupled to the data network. In one embodiment, however, the MSC 46 may be coupled to a gateway (GTW) 48, and the GTW 48 may be coupled to a WAN, such as the Internet 50. In turn, devices such as processing elements (e.g., personal computers, server computers or the like) may be coupled to the mobile terminal 10 via the Internet 50. For example, as explained below, the processing elements may include one or more processing elements associated with a computing system 52 (two shown in FIG. 2), origin server 54 (one shown in FIG. 2) or the like, as described below.

As shown in FIG. 2, the BS 44 may also be coupled to a signaling GPRS (General Packet Radio Service) support node (SGSN) 56. As known to those skilled in the art, the SGSN 56 may be capable of performing functions similar to the MSC 46 for packet switched services. The SGSN 56, like the MSC 46, may be coupled to a data network, such as the Internet 50. The SGSN 56 may be directly coupled to the data network. Alternatively, the SGSN 56 may be coupled to a packet-switched core network, such as a GPRS core network 58. The packet-switched core network may then be coupled to another GTW 48, such as a GTW GPRS support node (GGSN) 60, and the GGSN 60 may be coupled to the Internet 50. In addition to the GGSN 60, the packet-switched core network may also be coupled to a GTW 48. Also, the GGSN 60 may be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown in FIG. 2 and described herein, it should be appreciated that electronic devices, such as the mobile terminal 10, may be coupled to one or more of any of a number of different networks through the BS 44. In this regard, the network(s) may be capable of supporting communication in accordance with any one or more of a number of first-generation (1G), second-generation (2G), 2.5G, third-generation (3G), fourth generation (4G) and/or future mobile communication protocols or the like. For example, one or more of the network(s) may be capable of supporting communication in accordance with 2G wireless communication protocols IS-136 (TDMA), GSM, and IS-95 (CDMA). Also, for example, one or more of the network(s) may be capable of supporting communication in accordance with 2.5G wireless communication protocols GPRS, Enhanced Data GSM Environment (EDGE), or the like. Further, for example, one or more of the network(s) may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile terminals (e.g., digital/analog or TDMA/CDMA/analog phones).

As depicted in FIG. 2, the mobile terminal 10 may further be coupled to one or more wireless access points (APs) 62. The APs 62 may comprise access points configured to communicate with the mobile terminal 10 in accordance with techniques such as, for example, radio frequency (RF), Bluetooth™ (BT), infrared (IrDA) or any of a number of different wireless networking techniques, including wireless LAN (WLAN) techniques such as IEEE 802.11 (e.g., 802.11a, 802.11b, 802.11g, 802.11n, etc.), Wibree™ techniques, WiMAX techniques such as IEEE 802.16, Wireless-Fidelity (Wi-Fi) techniques and/or ultra wideband (UWB) techniques such as IEEE 802.15 or the like. The APs 62 may be coupled to the Internet 50. Like with the MSC 46, the APs 62 may be directly coupled to the Internet 50. In one embodiment, however, the APs 62 may be indirectly coupled to the Internet 50 via the GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 may communicate with one another, the computing system, etc., to thereby carry out various functions of the mobile terminals 10, such as to transmit data, content, service or the like to, and/or receive content, data, service, or the like from, the computing system 52. As used herein, the terms "data," "content," "information", "service" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 and/or origin server 54 across the Internet 50, the mobile terminal 10, computing system 52 and origin server 54 may be coupled to one another and communicate in accordance with, for example, RF, BT, IrDA or any of a number of different wireline or wireless communication techniques, including LAN, WLAN, WiMAX, Wireless Fidelity (Wi-Fi), Wibree™ and/or UWB techniques. One or more of the computing systems 52 may additionally, or alternatively, include a removable memory capable of storing content, which can thereafter be transferred to the mobile terminal 10. Further, the mobile terminal 10 may be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, Wibree™, Wi-Fi, WLAN, WiMAX and/or UWB techniques. In this regard, the mobile terminal 10 may be capable of communicating with other devices via short-range communication techniques. For instance, the mobile terminal 10 may be in wireless short-range communication with one or more devices 51 that are equipped with a short-range communication transceiver 80. The electronic devices 51 may comprise any of a number of different devices and transponders capable of transmitting and/or receiving data in accordance with any of a number of different short-range communication techniques including but not limited to Bluetooth™, RFID, IR, WLAN, Infrared Data Association (IrDA) or the like. The electronic device 51 may include any of a number of different mobile or stationary devices, including other mobile terminals, mobile telephones, mobile communication devices, wireless accessories, appliances, portable digital assistants (PDAs), pagers, laptop computers, mobile computers, desktop computers, gaming devices, audio/video players, digital still/video cameras, positioning devices (such as a Global Positioning System (GPS) device), televisions, motion sensors, light switches, or any combination of the aforementioned, and other types of electronic devices.

Figure 3:
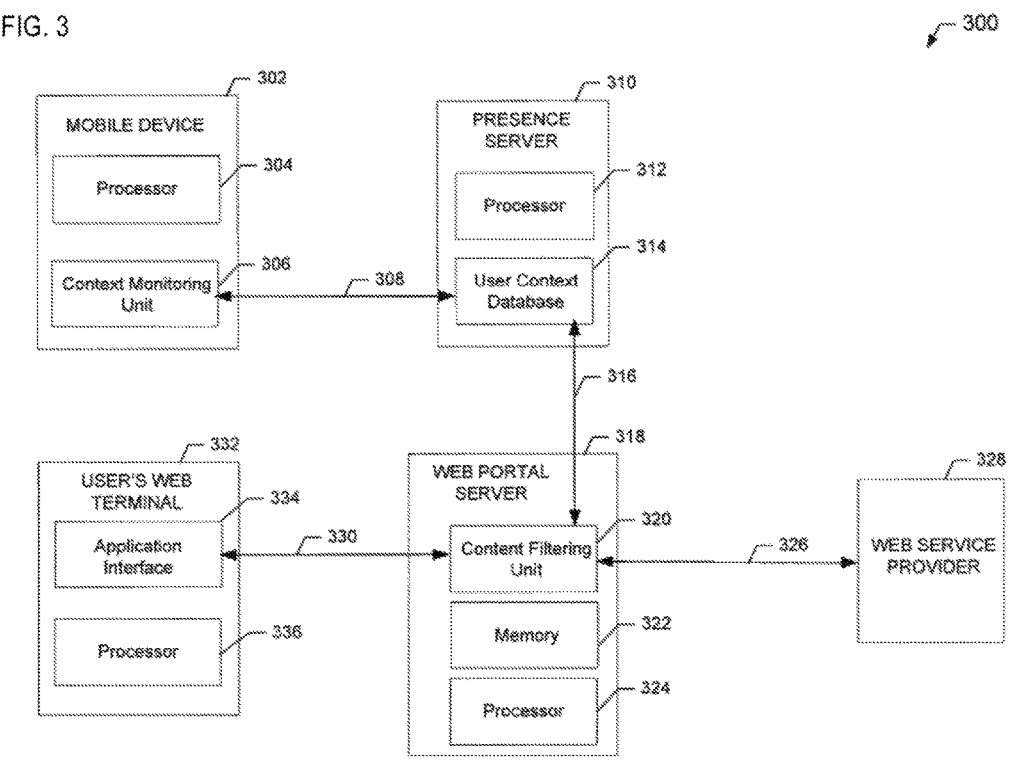
FIG. 3 illustrates a block diagram of a system for providing filtered services or content based on user context according to an exemplary embodiment of the present invention.

FIG. 3 illustrates a block diagram of a system 300 for providing filtered services and content according to an exemplary embodiment of the present invention. As used herein, "exemplary" merely means an example and as such represents one example embodiment for the invention and should not be construed to narrow the scope or spirit of the invention in anyway. It will be appreciated that the scope of the invention encompasses many potential embodiments in addition to those illustrated and described herein. The system 300 will be described, for purposes of example, in connection with the mobile terminal 10 of FIG. 1 and the system of FIG. 2. However, it should be noted that the system of FIG. 3, may also be employed in connection with a variety of other devices, both mobile and fixed, and therefore, embodiments of the present invention should not be limited to application on devices such as the mobile terminal 10 of FIG. 1. Further, the system of FIG. 3 may employ systems for communication other than that illustrated in FIG. 2. It should also be noted, that while FIG. 3 illustrates one example of a configuration of a system for automatically finding configuration settings for services, numerous other configurations may also be used to implement embodiments of the present invention.

Referring now to FIG. 3, the system 300 may include a mobile device 302, a presence server 310, a web portal server 318, a web service provider 328, and a user's web terminal ("web terminal") 332. In some embodiments, the mobile device 302 may be a mobile terminal 10. However, the mobile device 302 may be any computing device capable of monitoring a user's context as described herein. In some embodiments, the presence server 310, web portal server 318, and web service provider 328 may be embodied as a computing system 52 or origin server 54 of the system 47 of FIG. 2.

Although referred to herein as a "server," the presence server 310 and the web portal server 318 may be embodied as any computing device or plurality of computing devices in a variety of computer system architectures, including those which are not client-server architectures. Further, as used herein, a "user's context," or "context," which may be used interchangeably, refer to, for example, a user's location, a device from which the user has requested services or content, other individuals in the user's presence, a time of day, an event, a date, or other information that defines the environment, surroundings, or setting of the user. "Content" and "services" may be used interchangeably herein, and collectively refer to, for example, photographs and other image content, video content, music or other audio content, television/radio broad/multi/unicasting or streaming, video games, news feeds and content, blogs, web pages, maps, advertisements, vendor offers such as may be provided by an online retailer, search results such as may be returned by a search engine in response to a user search, as well as social networking content and services, any combination of the aforementioned, or any other information or material provided to or requested by the user. Although referred to as a web service provider 328, the web service provider 328 is not limited to embodiments operable on the Internet. It will be appreciated that the web service provider 328, as well as embodiments of the invention may be configured to be operable on other networks, including intranets, wide area networks, and the like and may communicate using any of a number of network protocols.

The mobile device 302 may include a processor 304, which may be a controller 20 of a mobile terminal 10, as well as a context monitoring unit 306. The context monitoring unit 306 may be embodied as hardware, software, or a combination thereof and may be embodied as or otherwise executed by the processor 304. In this regard, the context monitoring unit 306 may be configured to monitor the context of the user. The context monitoring unit 306 may monitor the current location of the mobile device 302, which may be determined, for example, based upon a position determined by the positioning sensor 36 of a mobile terminal 10. In this regard, the current location of the mobile device 302 may be assumed to be the location of the user of the mobile device 302 in determining the user's context. The context monitoring unit 306 may further be configured to monitor other devices in close proximity to the mobile device 302. In this regard, each user of the system 300 or even other devices communicating over a larger network, such as the network of the system of FIG. 2 may be uniquely identifiable and associated with a user. Accordingly, the context monitoring unit 306 may detect devices in close proximity to the mobile device 302 using various near-field communication technologies, such as, for example, RF (such as via RF transceiver 64 of a mobile terminal 10), IR (such as via IR transceiver 66 of a mobile terminal 10), Bluetooth (such as via BT transceiver 68 of a mobile terminal 10), as well as other near-field technologies and wireless networking protocols. In some embodiments, the context monitoring unit 306 may be configured to directly monitor individuals in proximity to the mobile device 302, even if one or more individuals are not in possession of a device or if device(s) possessed by one or more individuals are not recognized by the context monitoring unit 306, through the use of voice recognition. In this regard, the context monitoring unit 306 may monitor and/or determine individuals such as coworkers and family members in close proximity to the mobile device 302 based upon unique device identifiers of proximate devices which are associated with other users or based upon known voice signatures of individuals.

In addition to location detection through the use of the positioning sensor 36 and proximity sensing, the context monitoring unit 306 may determine further user context information through the use of various environmental sensors. These environmental sensors may be embodied internally to the mobile device 302 or additionally or alternatively, may be embodied externally to and communicate with the mobile device 302. Environmental sensors may monitor and report a variety of information to the context monitoring unit 306, such as for example, ambient air temperature surrounding the mobile device 302, direction of motion of the mobile device 302, rate of motion of the mobile device 302, etc.

The context monitoring unit 306 may further be configured to determine other user context information from applications or devices, which may be executed by or otherwise embodied on the processor 304 or may be executed by or embodied on remote devices which may be in communication with the context monitoring unit 306. For example, the context monitoring unit 306 may determine a current time or date from a clock application which may be embodied on the mobile device 302 or on a remote device such as any of the devices of the system of FIG. 2. The context monitoring unit 306 may additionally, for example, determine whether the user currently has a scheduled appointment or other event, which the user may have entered into a calendar or other scheduling management program, which may be embodied on the mobile device 302 or a remote device such as any of the devices of the system of FIG. 2. In this regard, the context monitoring unit 306 may determine a user's context through any information about a current event, information about the user, or information about one or more active applications on a device associated with the user, which is stored or may otherwise be obtained from an application or device in communication with the context monitoring unit 306 as well as current status information related to the mobile device 302 itself.

The context monitoring unit 306 may further be configured to communicate current user context information to a remote device, such as the presence server 310, over a communication link, such as the communication link 308, which may be a communication link in accordance with any of those illustrated and described in connection with the system of FIG. 2. In some embodiments, the context monitoring unit 306 may communicate current context information to or otherwise "sync" current context information with a second device associated with the user, such as a web terminal 332. In such embodiments, this second device associated with the user may then communicate context information to the presence server 310. In this regard, in an exemplary embodiment, the context monitoring unit 306 may be configured to communicate current user context information to a remote device at regular intervals. In addition or alternatively, the context monitoring unit 306 may be configured to communicate current user context information to a remote device at the request of the remote device, such as at the request of the presence server 310, web portal server 318, or web service provider 328. In some embodiments, the context monitoring unit 306 may additionally or alternatively communicate current user context information to a remote device in response to a change in context information and/or in response to a command of the user, which may be entered over a user interface of the mobile device 302, such as via the keypad 30 of a mobile terminal 10.

The presence server 310 may include a processor 312 and a user context database 314. The processor 312 may be a single processor or may comprise multiple processors executed in parallel, which may be contained in a single computing device or may be distributed among multiple computing devices, such as in a server cluster. The user context database 314 may be stored on or otherwise embodied as a memory component, which may be embodied in the presence server 310, a remote device, or in a plurality of devices in communication with the presence server 310. The user context database 314 may be configured to store user context information for a plurality of users in association with an identifier indicative of the respective user with whom each set of user context information is associated. In this regard, the user context database 314 may be configured to receive and/or request scheduled and/or unscheduled updates of user context information from the context monitoring unit 306 via the communication link 308 and store received context information in association with the user from whose mobile device 302 the context information was received. The user context database 314 may further be configured to periodically and/or on request transmit stored user context information to another component or device, such as the content filtering unit 320 of a web portal server 318 over the communication link 316. The communication link 316 may be any of the communication links described in connection with the system of FIG. 2. In this regard, the receipt, storage, and transmission of user context information by the user context database 314 may be controlled by the processor 312.

Although not illustrated in FIG. 3, in some embodiments the presence server 310 may be embodied in a network access point 62 or gateway 48. In such embodiments the presence server 310 may communicate directly with the web terminal 332, such as over communication link 330, as well as with the mobile device 302 over communication link 308 and the web portal server 318 over communication link 316.

Although illustrated in accordance with one embodiment in FIG. 3 as separate computing devices, the presence server 310 and web portal server 318 may be embodied on a single computing device. The web portal server 318 may include a content filtering unit 320, memory 322, and a processor 324. The processor 324 may be a single processor or may comprise multiple processors executed in parallel, which may be contained in a single computing device or may be distributed among multiple computing devices, such as in a server cluster. The content filtering unit 320 may be embodied as software, hardware, or a combination thereof and may be controlled by or otherwise embodied as the processor 324. The content filtering unit 320 may be configured to receive a request for a service or content from a remote device, such as the web terminal 332 and to filter the requested service or content and provide the filtered content to the web terminal 332, such as over the communication link 330. In this regard, the web portal server 318 may be, for example, a computing device, system of computing devices, or a service provider providing any of several commonly known web portal or search services to computing device users. Examples of these web portal services include search services, such as those provided by OVI® and GOOGLE®, photo hosting services such as FLICKR™, social networking providers such as FACEBOOK™, a gaming server, or a multimedia content server. The content filtering unit 320 may be configured to retrieve unfiltered requested services or content from a web service provider 328, such as over a communication link 326. According to one embodiment illustrated in FIG. 3, the web portal server 318 may be a gateway computing device wherein a user of a web terminal 332 may log in and retrieve services or content from a plurality of web service providers 328. In alternative embodiments, however, the web portal server 318 and web service provider 328 may be embodied on a single computing device and the requested service or content may be stored or otherwise be embodied local to the content filtering unit 320. Furthermore, in some alternative embodiments, the presence server 310, web portal server 318, and web service provider 328 may be embodied as a single device, system, or service provider.

Further, although not illustrated herein, the web portal server 318 may merely serve as a communication intermediary, such as a network access point 62 or gateway 48, between the web terminal 332 and the web service provider 328 and the actual filtering of content and services may occur on the web service provider 328. In such embodiments, the content filtering unit 320 may be embodied on the web service provider 328. Alternatively, the content filtering unit 320 may be also embodied in the network access point 62 or the gateway 48.

The content filtering unit 320 may be configured to filter services or content requested by a requesting user of a web terminal 332 based upon the requesting user's context information in accordance with the requesting user's one or more user-defined filtering criteria, which may be stored in memory 322. In this regard, the content filtering unit 320 may request from the user context database 314 the context information of the requesting user. Although not illustrated in FIG. 3, in alternative embodiments, the content filtering unit 320 may additionally or alternatively request current context information for a requesting user directly from a mobile device 302 associated with the requesting user. In addition to the context information received from the user context database 314 or directly from the context monitoring unit 306 of a mobile device 302, the content filtering unit 320 may receive additional context information from the web terminal 332, which may be combined with context information received from the user context database 314 or context monitoring unit 306. This additional context information may include, for example, an indication uniquely identifying the web terminal 332 or the user of the web terminal 332 so that further filtering may be performed based upon an identity or characteristic of the user or the web terminal 332 from which the requesting user is requesting services or content. In this regard, the web terminal 332 may be any computing device with network connectivity and an indication identifying the web terminal 332 may be, for example, an IP address.

The content filtering unit 320 may retrieve appropriate user-defined filtering criteria from the memory 322. In this regard, the memory 322 may store multiple sets of filtering criteria in association with a user. Each set of filtering criteria (i.e. a filtering profile) for a user may be associated with a particular context of the user, such as a location from which the user is requesting services or content, and/or with the type of service or content that the user is requesting. Thus the content filtering unit 320 may be configured to determine and retrieve an appropriate set of filtering criteria for the requesting user based upon the user's context, the requested service or content, as well as any other predefined factors.

The content filtering unit 320 may be configured to filter services or content using the content filtering criteria based upon metadata information, i.e., meta tags, or other identifiers associated with the services or content. For example content or media, such as photograph content, may be tagged with meta tags or other associated identifiers indicating individuals or objects present in the content or media, locations at which the content or media were taken or created, topic of the content or media, related locations or topics, and/or social context (such as personal, work, friends, family, or secret). Social networking contacts may be tagged with indications of a relationship to the user, such as coworker, friend, or family. Content or media, such as video, photographs, audio, gaming, and web page content and services may be rated according to a content ratings standards. For example, video content may be rated by the Motion Pictures Association of America (MPAA); web pages and other interne content may be rated by the Internet Content Rating Association (ICRA); gaming content and services may be rated by the Entertainment Software Ratings Board (ESRB); and music content may be rated in accordance with standards of the Recording Industry Association of America (RIAA). In this regard, a user may define filtering criteria such that the content filtering unit 320 may filter out content or services in certain contexts which have been rated inappropriate for certain age groups by a third party content standards ratings group.

Accordingly, a user may register with the web portal server 318 and predefine a number of sets of filtering criteria prior to requesting a service or content. Registration may be through the use of a mobile device 302 or any other computing device, such as a web terminal 332. A user may define an address or other indication of a device from which his context information may be retrieved by the content filtering unit 320. This indication may thus define an address of a presence server 310 or an address of the mobile device 302. In this regard, in embodiments in which the content filtering unit 320 retrieves user context information directly from a mobile device 302 and wherein a user registers with the web portal server 318 using a mobile device 302, a component of the web portal server 318 may be configured to automatically associate an address or other identifier of the mobile device 302 with the user for the purpose of future context information retrieval. In defining the various sets of filtering criteria, the web portal server 318 may be configured to present a user with a number of filtering options via a user interface. For example, for location-based filtering criteria, a user may be provided with the option to assign a designated location and set of filtering criteria with the current position of his mobile device 302. Additionally or alternatively, a user may be presented with a map or other visual means to select a plurality of locations with which he desires to associate sets of filtering criteria. The user may also associate filtering criteria with identifiers of devices associated with other users, such as phone numbers of mobile devices associated with friends, coworkers, and family, such that the filtering criteria is employed when the user is in proximity to the devices of the other user.

After registering with the web portal server 318, a user may log onto the web portal server 318, such as by entering a login ID, such as a unique user name and password combination, prior to requesting a service or content. Additionally or alternatively, the web portal server 318 may be configured to recognize a requesting user without requiring a prior logon. For example, the web portal server 318 may recognize a requesting user based upon the identity of a web terminal 332, such as may be determined by IP address recognition of the user device, used by the requesting user to make a request. Additionally or alternatively, the web portal server 318 may recognize a requesting user based upon an identifier, such as a web browser cookie, stored remotely on the web terminal 332 and provided by an application executed on the web terminal 332 and used by the requesting user to make a request.

The web terminal 332, or other user terminal, may include a processor 336 and an application interface 334. The web terminal 332 may be a stationary or mobile device like a personal computer, laptop computer, a mobile computer, a mobile communication device, a mobile phone, a television, a radio, a set-top box (STB), a game console, a digital video recorder (DVR), an audio/video player, a still/video camera, or any combination of the aforementioned. Although depicted in FIG. 3 as separate devices, in some embodiments the web terminal 332 and mobile device 302 may be embodied as the same device, which may communicate context information to the user context database 314 of the presence server 310 and may communicate service requests to and receive filtered content from the content filtering unit 320 of the web portal server 318.

The application interface 334 may be defined by computer program instructions that are executed on or otherwise controlled by the processor 336. The application interface 334 may be any application or user interface used to access content or services over a network, such as that of the system 300. In this regard, the application interface 334 may be configured to access multiple services and forms of content in accordance with embodiments of the invention, or a web terminal 332 may include a plurality of application interfaces 334, each of which is configured for a particular service or content. As such, an application interface 334 may be, for example, a web browser, a media/video/audio player, gaming application, a news reader, or other common software used to access and facilitate user interaction with requested services and content. Accordingly the application interface 334 may be configured to provide a user interface to a user and in response to a user request, transmit a request for a service or content over communication link 330 to the content filtering unit 320. The transmitted request may also include an identifier indicating the requesting user, such as a login request, login ID, cookie, or other user identification means, so that the content filtering unit 320 may filter the requested services or content accordingly. The application interface 334 may further be configured to receive filtered services or content and subsequently display, playback, or otherwise facilitate the execution of or interaction with the received filtered service or content.

Figure 4:
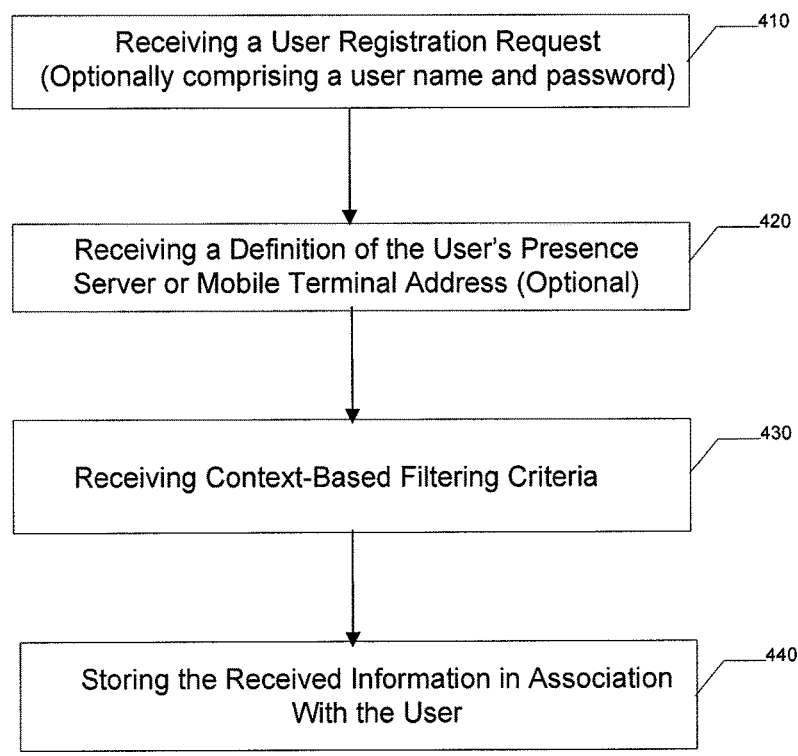
FIG. 4 is a flowchart according to an exemplary method for receiving a user registration request and context-based filtering criteria according to an exemplary embodiment of the present invention.
Figure 5:
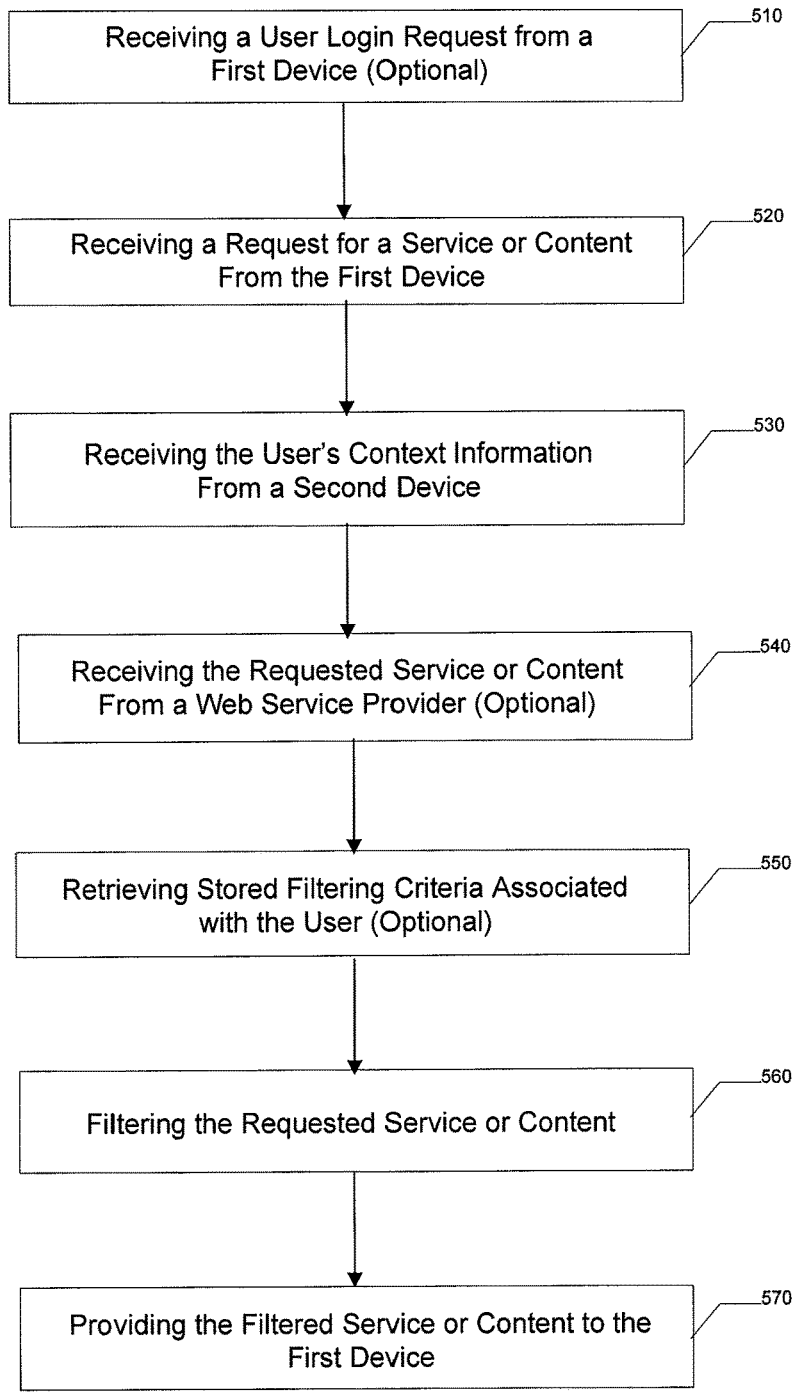
FIG. 5 is a flow chart according to an exemplary method for providing filtered services or content based on user context according to an exemplary embodiment of the present invention.

FIGS. 4 and 5 are flowcharts of a system, method, and computer program product according to an exemplary embodiment of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or server and executed by a built-in processor in a mobile terminal or server. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowchart, may be implemented by special purpose hardware-based computer systems which perform the specified functions or steps, or combinations of special purpose hardware and computer instructions.

In this regard, one embodiment of a method for receiving a user registration request and context-based filtering criteria as illustrated in FIG. 4 may include the web portal server receiving a user registration request at operation 410. This user registration request may optionally comprise receiving a login ID, such as a user name and password, for the registering user. The web portal server may then optionally receive a definition of the user's presence server or mobile terminal address at operation 420. This definition may comprise any indication of a device from which the user's mobile context information may be retrieved, wherein the indication allows for recognition of and communication with in accordance with any appropriate networking protocol. In this regard, the definition may be, for example, an IP address, URL, or phone number uniquely identifying the device on a network. Operation 430 may then comprise receiving one or more sets of context-based filtering criteria. The received information may then be stored in memory 322 in association with the registering user at operation 440.

FIG. 5 illustrates one embodiment of a method for providing filtered services or content based on user context. The method may optionally include receiving a user login request from a first device at operation 510. In this regard, a user login request may include an indication of a device identity that may be associated with a user, such as an IP address or IMEI code, or browser cookies, as well as a login identifier, such as a user name and optional password. The content filtering unit 320 may then receive a request for a service or content from the first device, such as the web terminal 332, at operation 520. Operation 530 may comprise receiving the user's context information from a second device, such as from the presence server 310 or the mobile device 302. Accordingly, the second device is separate from the first device. It will be appreciated that as used herein, "separate from" merely means not the exact same physical device, but does not carry any broader implication with regard to a type of device or location of a device. Operation 540 may optionally comprise receiving the requested service or content from a web service provider 328. This operation may not be necessary in embodiments wherein the functionalities of the web portal server 318 and the web service provider 328 are embodied on a single computing device. The content filtering unit 320 may then retrieve stored filtering criteria associated with the user from memory 322 at operation 550. Operation 560 may then comprise the content filtering unit 320 filtering the requested service or content. The content filtering unit 320 may then provide the filtered service or content to the first device, such as the web terminal 332 at operation 570.

The above described functions may be carried out in many ways. For example, any suitable means for carrying out each of the functions described above may be employed to carry out embodiments of the invention. In one embodiment, all or a portion of the elements generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages to a user using a computing device to access content and services. For example, a user may wish to have requested content and services filtered depending on his current context. By providing the user with a system according to embodiments of the invention for automatically filtering content and services based upon the user's context as monitored in part by a mobile device associated with the user, the user may be provided with an enhanced experience when accessing content and services over a network. In this regard, embodiments of the system may facilitate a user receiving content and services filtered according to user-defined parameters regardless of the device used to access the content and services without having to configure each individual access device. Additionally embodiments of the invention may facilitate the filtering of any content or service without necessitating each individual content or service used by a user to be configured according to user filtering preferences.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving in a first device a login request with an indication of identification information of a user, wherein the identification information is associated with a second device;
    requesting context information of the user, wherein the context information is associated with the second device, and wherein the second device is separate from the first device; and
    providing a service to the first device based on received context information.

2. The method of claim 1, further comprising:
    requesting the context information from a presence server associated with the second device, wherein the presence server comprises a user context database configured to receive and/or request updates of the context information; and
    transmitting periodically and/or on request by the presence server stored context information.

3. The method of claim 1, further comprising:
    requesting the context information from the second device associated with the identification information; and
    receiving the context information from the second device.

4. The method of claim 1, wherein the service further comprises:
    filtering requested services or contents based, at least in part, on context filtering criteria, content filtering criteria, user-defined parameters, or a combination thereof.

5. The method of claim 4, wherein the content filtering criteria comprises metadata information, content ratings standards, identifiers associated with services or contents, or a combination thereof.

6. The method of claim 1, wherein the login request comprises a device identifier, a login identifier, or a combination thereof.

7. The method of claim 6, wherein the device identifier comprises International Mobile Equipment Identity (IMEI) code, Internet Protocol (IP) address, browser cookies, or a combination thereof.

8. The method of claim 6, wherein the login identifier comprises a preset username and password combination.

9. The method of claim 1, wherein the user's context information comprises location information of a user, identification information of the second device, identification information of one or more devices proximate to the first device, identification information of one or more users proximate to the first device, temporal information, environment information or a combination thereof.

10. An apparatus comprising:
    at least one processor; and
    at least one memory including computer program code for one or more programs,
    the at least one memory and the computer program code configured to, with the at least one processor, cause the apparatus to perform at least the following,
    receive in a first device a login request with an indication of identification information of a user, wherein the identification information is associated with a second device;
    request context information of the user, wherein the context information is associated with the second device, and wherein the second device is separate from the first device; and
    provide a service to the first device based on received context information.

11. The apparatus of claim 10, wherein the apparatus is further caused to:
    request the context information from a presence server associated with the second device, wherein the presence server comprises a user context database configured to receive and/or request updates of the context information; and
    transmit periodically and/or on request by the presence server stored context information.

12. The apparatus of claim 10, wherein the apparatus is further caused to:
    request the context information from the second device associated with the identification information; and
    receive the context information from the second device.

13. The apparatus of claim 10, wherein the service further comprises:
    filter requested services or contents based, at least in part, on context filtering criteria, content filtering criteria, user-defined parameters, or a combination thereof.

14. The apparatus of claim 13, wherein the content filtering criteria comprises metadata information, content ratings standards, identifiers associated with services or contents, or a combination thereof.

15. The apparatus of claim 10, wherein the login request comprises a device identifier, a login identifier, or a combination thereof.

16. The apparatus of claim 15, wherein the device identifier comprises International Mobile Equipment Identity (IMEI) code, Internet Protocol (IP) address, browser cookies, or a combination thereof.

17. The apparatus of claim 15, wherein the login identifier comprises a preset username and password combination.

18. A non-transitory computer-readable storage medium carrying one or more sequences of one or more instructions which, when executed by one or more processors, cause an apparatus to perform:
    receiving in a first device a login request with an indication of identification information of a user, wherein the identification information is associated with a second device;
    requesting context information of the user, wherein the context information is associated with the second device, and wherein the second device is separate from the first device; and
    providing a service to the first device based on received context information.

19. The non-transitory computer-readable storage medium of claim 18, wherein the apparatus is further caused to perform:
    requesting the context information from a presence server associated with the second device, wherein the presence server comprises a user context database configured to receive and/or request updates of the context information; and transmitting periodically and/or on request by the presence server stored context information.

20. The non-transitory computer-readable storage medium of claim 18, wherein the apparatus is further caused to perform:
   requesting the context information from the second device associated with the identification information; and
   receiving the context information from the second device.

\* \* \* \* \*